May 20, 1941. F. F. NOXON 2,242,592

FISH LURE

Filed Feb. 13, 1940

INVENTOR,
Frank F. Noxon
BY
ATTORNEY.

Patented May 20, 1941

2,242,592

UNITED STATES PATENT OFFICE 2,242,592

FISH LURE

Frank F. Noxon, Santa Monica, Calif.

Application February 13, 1940, Serial No. 318,687

5 Claims. (Cl. 43—36)

My invention relates to fish lures of the type adapted to act automatically to expand in the mouth of a fish as soon as the mouth of the fish takes hold of it, whereby to prevent the fish backing off of the hook after it has expanded.

Among the salient objects of my invention are: to provide an improved lure body with a tubular bore or member therethrough and with the hooks and their holding link inserted into the free end thereof in such a manner that just the hook portions of the hook project and with the points of the hooks in parallel relationship with the arms of the hooks; to provide in such a mechanism an attaching link within the tubular portion of the body of such length that it will be withdrawn sufficiently to allow its end, to which the hooks are attached, to be out of the end of the body, thereby permitting free swivel like movement of the gang hooks outside the tube.

In order to more fully explain my invention, I have shown a practical embodiment thereof on the accompanying sheet of drawings, which I will now describe:

Figure 1:
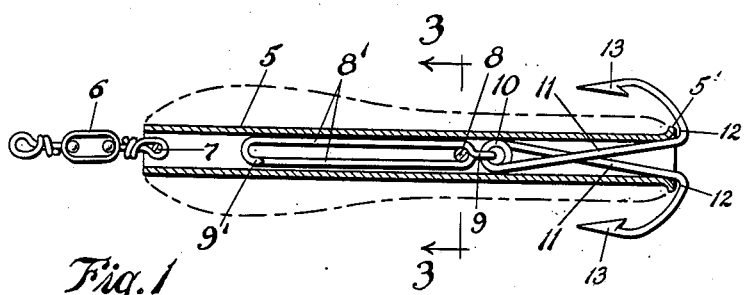
Figure 1 is a longitudinal sectional view through a fish lure embodying my invention, with the hooks within the lure body as far as they will go; the body being indicated in broken lines.
Figure 2:
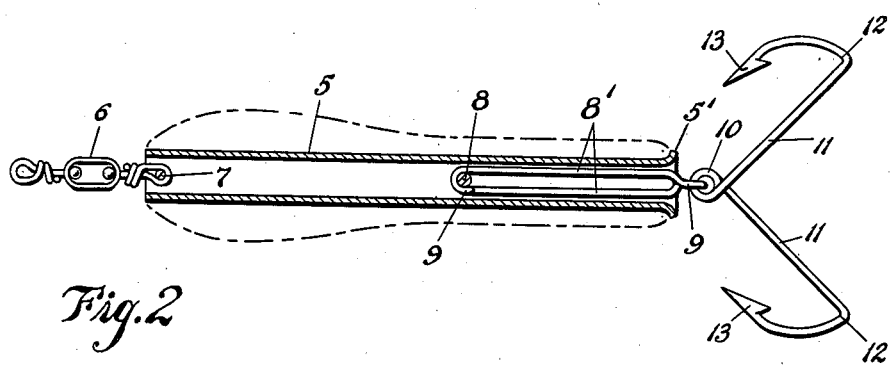
Figure 2 is a similar view, showing the gang hooks fully out, as they would be in the mouth of the fish.

In the manufacture of my invention, any suitable body can be used, and can be in the form of a fish, as indicated by the light broken line outline in Figs. 1 and 2, and within this body is inserted a metal tube 5, open at both ends and at its hook end shown slightly flared, as at 5'.

Figure 3:
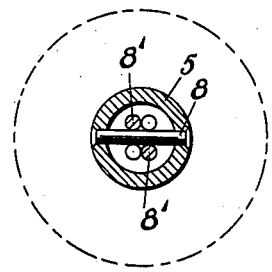
Figure 3 is an enlarged cross sectional view on line 3—3 of Fig. 1.
Figure 4:
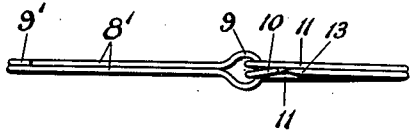
Figure 4 is an edge view of the link and the hooks to show how they are formed.

In the line end of this tube is a swivel 6, secured by a through pin 7, through the tube, as indicated. In the middle portion of said tubular member is a second through pin 8, also seen in Fig. 3, over which is a spring wire link 8', having an eye formed at one end, as at 9, and at its other end having its ends bent into hook portions, as 9', the eye 9 being turned to right angles to the link proper. The length of the link 8' is such that when it is drawn to the hook end of the tube, the eye 9 will be outside of the tube, as indicated in Fig. 2.

My hook may be referred to as a gang hook and is formed of spring steel wire coiled in the middle, say two and a half turns, as at 10, with the arms 11, 11, normally at right angles to each other, as indicated in Fig. 2. At their ends, said arms 11, 11, are bent at an angle, as at 12, 12, and then curved crescent like and provided at their extreme ends with sharp hooks, with the barbs, designated as a whole 13, 13, although the hooks might be made plain.

It will be noted that the direction of the points is parallel with the arms and that when the hooks are drawn inwardly, as in Fig. 1, they lie rather close to the body. The arms 11, 11, are put under tension when they are brought together to be moved into the tubular member 5, and the friction at the flared end of the tube is such as to keep the arms of the hook within the tube, but as soon as any pressure inwardly, toward the tube, is put upon the hooks or points, the tension of the arms outwardly causes them to cam on the smooth inside of the tube and to fly outwardly, out of the tube, and outwardly, apart, as seen in Fig. 2. So that as soon as the mouth of a fish passes over the hooks in the positions shown in Fig. 1, the slightest pressure on these hooks causes them to be thrown out by the tension on said arms and the cam action or engagement with the rounded inner end of the tube.

Another important function resulting from my particular construction and arrangement is that there is caused what is the equivalent to a strike, or a sudden jerk, on the hook as the elongated member or link 8' reaches its outward limit and is suddenly stopped by the through pin 8. This is automatic and effective, for when the hook assembly moves from the position shown in Fig. 1 to the position shown in Fig. 2, it will be understood how the sudden stop of the link 8' by the pin 8, causes the substantial jerk or strike, forcing the hooks definitely into the mouth of the fish.

Another important feature of my invention is the abrupt turn at 12 of the hook proper from the arm 11. Anything catching on the hook is caused to move into this corner, close to the arm 11, and the pull, therefore, is directly on the arm, in alinement therewith, and not on the hoop proper with a tendency to straighten it out, as would be the case if the hook were formed with the usual uniform curvature from the arm into the hook proper.

Other advantages are to be had from a construction and arrangement such as I have shown for illustrative purposes, and while I have shown one practical embodiment of my invention, I am aware that slight changes can be made without departing from the spirit of the invention, and I do not, therefore, limit my invention to the showing made except as I may be limited by the hereto appended claims.

I claim:

1. A fish lure including a body having therein a tubular chamber open at its outer end, means for attaching a line to its other end, a gang hook of spring wire having two straight arms joined at one end and normally and yieldingly spread to angles to each other and adapted to be sprung together to be inserted into the open end of said chamber, said arms being provided at their outer ends with rearwardly directed hooks positioned to rest alongside of the end of said body when said arms are within said chamber, and a movable attaching member within said tubular chamber and pivotally attached to the joined ends of said arms and provided with means for limiting its outward movement from said chamber as said gang hook is pulled from said tubular chamber.

2. A fish lure including a body having therein a tubular chamber open at its outer end, means for attaching a line to its other end, a gang hook of spring wire having two straight arms joined at one end and normally and yieldingly spread to angles to each other and adapted to be sprung together to be inserted into the open end of said chamber, said arms being provided at their outer ends with rearwardly directed hooks positioned to rest along side of the end of said body when said arms are within said chamber, an elongated attaching loop within said tubular chamber and pivotally attached at one end to the joined ends of said arms, and a stop pin through said chamber and said loop to limit its outward movement from said chamber as said gang hook is pulled from said tubular member, the end of said loop member being outside the end of said chamber when in its outer position to permit free movement of said gang hook when pulled from said tubular chamber.

3. A fish lure including a body having a tubular chamber therein, means for attaching it to a line, a hook assembly inserted in the other end and adapted to be pulled longitudinally out of the end thereof and means for limiting the outward movement of the hook assembly from the end of said tubular chamber, whereby to cause a strike action by the sudden stopping thereof, the hook being pivotally connected to the assembly and including a straight arm having a hook formed at its end by an abrupt turn, whereby to form an angle at the open end of said arm, between the hook proper and said arm, to position pull close to and in alinement with the arm.

4. In a fish lure, a body, an elongated member therein to be moved into and out of said body longitudinally, a stop for limiting the outward movement with the end of said elongated member outside the end of said body, and a plural hook member connected to said elongated member, said hook member being composed of two straight arms joined together by coiled portions of said arms to connect said arms yieldingly at angles to each other, said arms having formed at their outer ends a hook on each arm with an abrupt angle formed at the end of the straight arm, between the hook proper and said arm, whereby matter catching on said hook moves to said angle, close to the straight arm, to put any pull on the arm and in alinement therewith.

5. A fish lure including an elongated body with means at one end for connecting it with a line, an elongated member in said body to be moved longitudinally in and out of the open end thereof, stop means for limiting the movement of said elongated member, and a gang hook connected pivotally with the end of said member, and consisting of two straight arms coiled together to form an attaching eye to be connected to said elongated member, with said arms spread outwardly at an angle to each other, each arm having formed a hook thereon by being bent rearwardly with the hook proper in parallel alinement with the arm proper, the juncture of the hook proper with the arm being by an abrupt angle to form a corner close to the end of the straight arm to take the pull of anything hooked, whereby to put the pull close to and in the direct line of the straight arm.

FRANK F. NOXON.